Patented Jan. 9, 1945

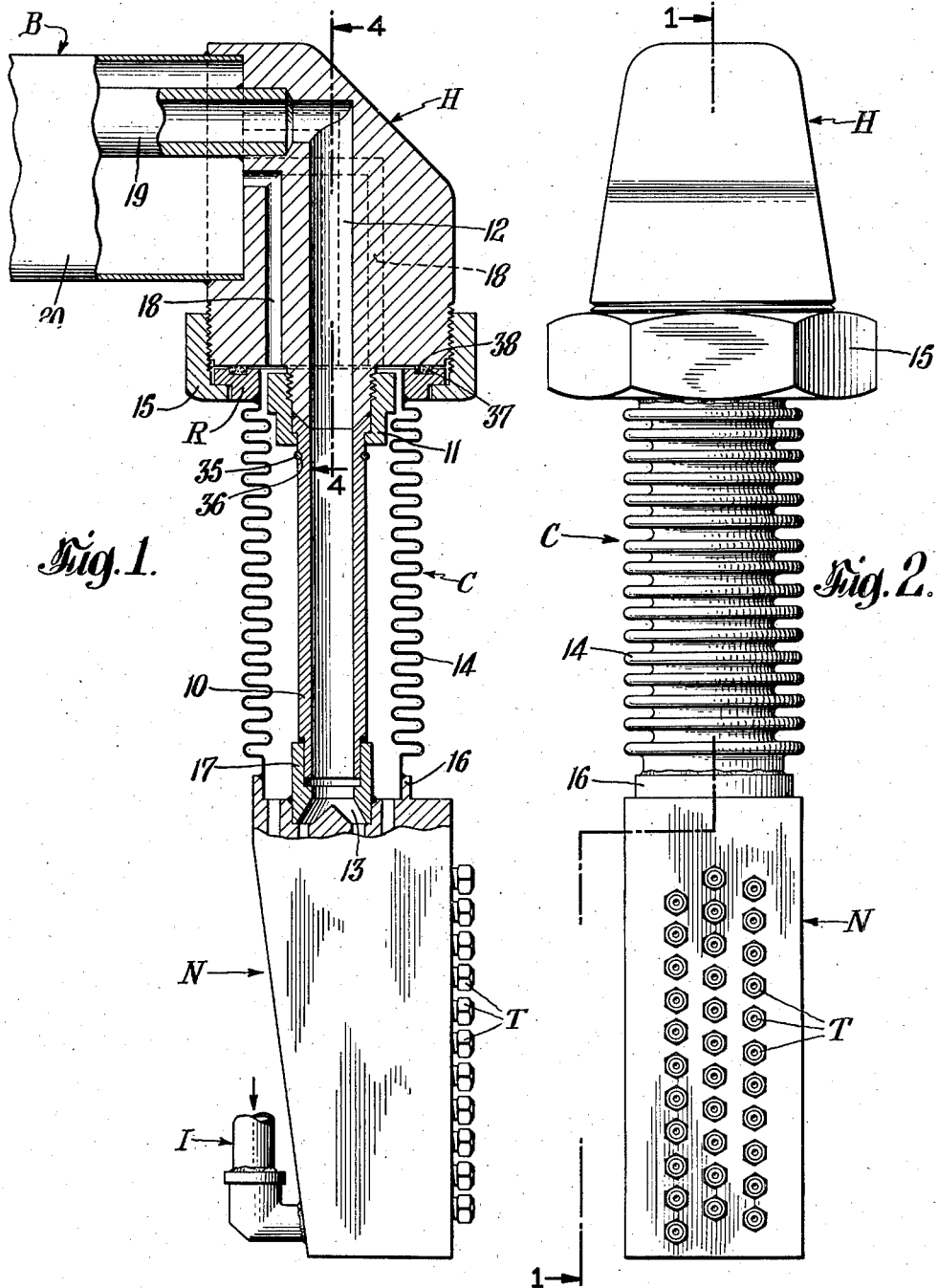

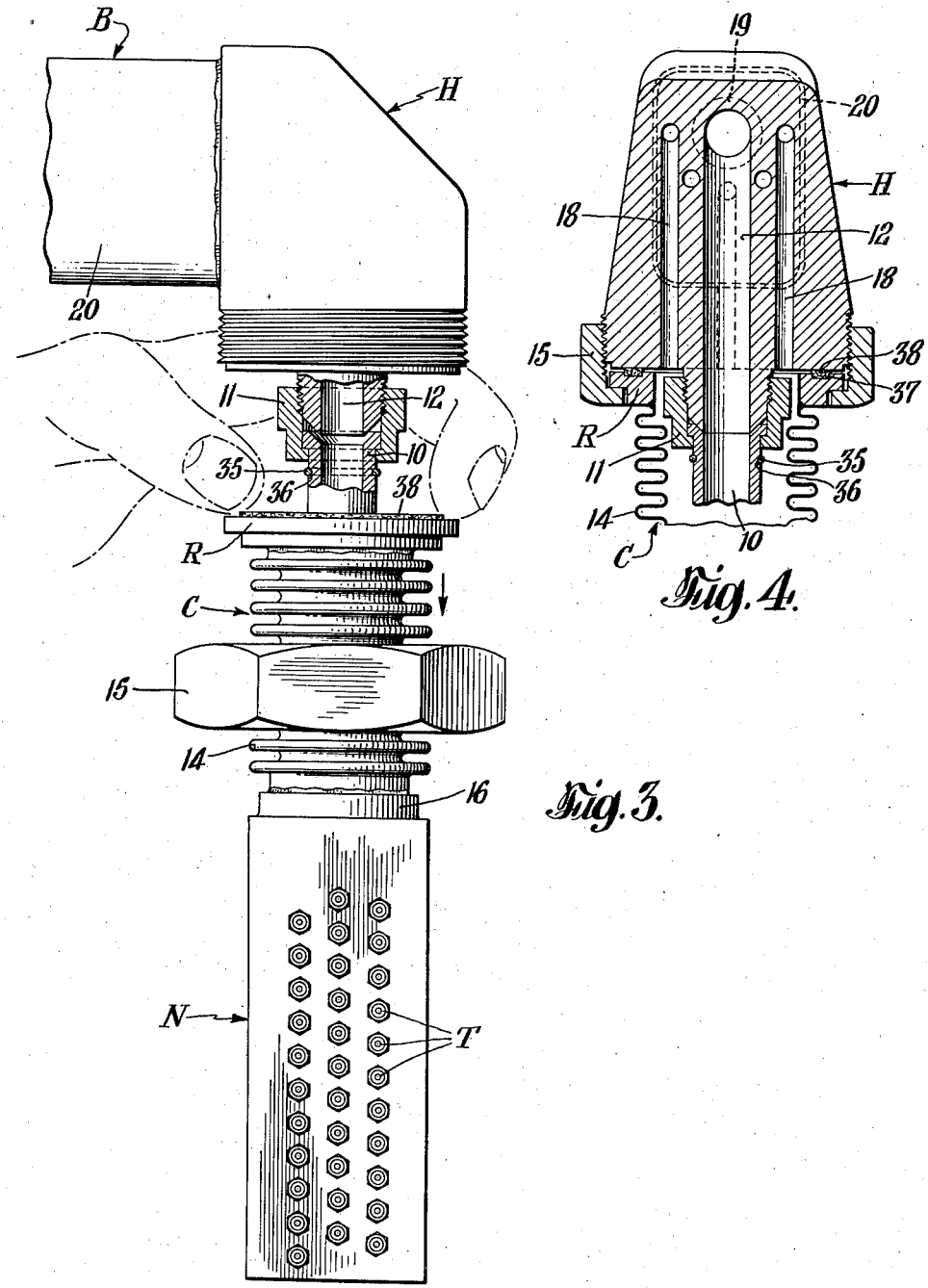

2,366,809

UNITED STATES PATENT OFFICE 2,366,809

ADJUSTABLE MULTIPLE CONNECTION

Arthur K. Seemann, Stamford, Conn., assignor to Union Carbide and Carbon Corporation, a corporation of New York Application February 24, 1943, Serial No. 476,900

7 Claims. (Cl. 285—22)

This invention relates to an adjustable multiple connection for coupling a pair of members through which separate fluids are passed. The invention is particularly useful in coupling a blowpipe head and nozzle between which a combustible gas or mixture of gases and a cooling liquid are conveyed, and wherein the nozzle is adapted to be adjusted to different positions, such as by rotation about the axis of the connection, in order to heat different types of articles.

Heretofore, adjustable multiple or dual connections between rigid and concentric tubular members have comprised swivel joints consisting of cooperating concave and convex or flat seats, having aligned cylindrical passages, through each of which a separate fluid is conveyed to a corresponding passage in the other member. A particular disadvantage of such swivel type joint, especially where the outer tube exceeds a diameter of the order of ½ to ¾ of an inch, lies in the fact that inherent difficulties are encountered in attempting to maintain good seating conditions. Furthermore, each time the joint is released or broken to permit adjustment or rotation of one or both of the members, the seal effected by the members between the concentric fluid passages is broken, with undesirable results. For instance, in a liquid cooled blowpipe nozzle, cooling liquid will flow into a gas passage, or vice versa, and either the gas passage will become temporarily contaminated with cooling liquid or gas will pass into and be trapped in the cooling liquid passage within the nozzle. Where the gas passage contains gas under pressure, additional difficulty is encountered with a poor inner seal owing to leakage of the gas into the cooling liquid passage with unfavorable results and possibly some hazard when the gas is combustible.

Among the main objects of this invention are to provide an adjustable multiple connection for coupling a pair of members through which a plurality of different fluids are passed, which combines ready internal accessibility and adjustability with maintenance of fluid tightness and prevention of any flow of fluid from one passage to another; which is compact and simple in construction; and which is highly suitable for releasably connecting a pair of members through which a gas and a liquid are passed. Other objects and novel features of this invention will become apparent from the following description.

According to the invention there is provided, for example, the combination with a blowpipe head, and a nozzle, of a rigid inner tubular member for conducting one fluid such as combustible gas from the head to the nozzle, and a longitudinally compressible outer tubular member surrounding the inner tubular member in spaced relation for conducting another fluid such as cooling water between the nozzle and the head. The inner tubular member is connected to the head by a releasable normally gas-tight annular joint for changing the position of the nozzle with respect to the head about the longitudinal axis of the inner member when the annular joint is partially released; while the outer tubular member is connected to the head by a releasable normally liquid-tight outer joint for exposing the inner joint for adjustment when the outer joint is wholly released and the outer member is longitudinally compressed.

Referring to the drawings:

Fig. 1 is a view mainly in cross section, taken along line 1—1 of Fig. 2, through the head and nozzle of a blowpipe provided with an adjustable connection constructed in accordance with this invention;

Fig. 2 is an end view of the head, nozzle, and adjustable connection of the blowpipe of Fig. 1;

Fig. 3 is a side view of the head and nozzle and connection of Fig. 1, illustrating adjustment of the nozzle with respect to the head; and Fig. 4 is a fragmentary cross-sectional view taken along line 4—4 of Fig. 1 through the blowpipe head.

In general, a preferred embodiment of this invention, as illustrated in Figs. 1 and 2, comprises an adjustable dual connection or coupling C between a head H and a liquid cooled nozzle N of an oxy-acetylene blowpipe B, the nozzle N being provided with on inlet I for the cooling liquid and tips T for discharging a plurality of oxy-acetylene jets adapted to form heating flames. The blowpipe B, with the nozzle shown by way of example, forms a part of apparatus for flame hardening gears (not shown), wherein a gear is rotated past the heating flames from the nozzle to heat the tooth surfaces of the gear to a temperature at or above a critical value, whereupon the gear is dropped into a tank of quenching liquid. Spur gears or pinions (not shown) are mounted in front of the nozzle N, but bevel gears or pinions (not shown) are mounted at the side of the nozzle, and it is necessary then to turn the nozzle through 90° to the position shown in Fig. 3, so that the heating flames produced by the gas jets discharged by tips T will be directed from the side rather than from the end of the blowpipe.

The connection C permits quick and easy positioning or rotation of the nozzle N. Connection C includes inner conduit means which comprises, essentially, a relatively rigid metal tube 10 adapted to support the nozzle N from head H, and an adjustable annular inner joint including a threaded union 11, which permits the nozzle N and tube 10 to be rotated through any desired angle about the longitudinal axis of the tube, preferably with only a slight release of the joint. Tube 10 passes a combustible gas or a mixture of gases such as oxygen and acetylene from a passage 12 in head H to a corresponding gas passage 13 in the nozzle N, and is surrounded in spaced concentric relation thereto by relatively flexible conduit means, such as a Sylphon bellows comprising an accordion-like corrugated metal (such as copper) tube 14 and an adjustable and separable joint including a threaded union 15, connecting the tube 14 with the head H. The lower end of the tube 14 is brazed or silver soldered to a flange 16 on the nozzle N, while the upper end of the tube 14 is similarly joined to a collar R which is engaged by the union 15. The collar R has an annular groove 37 containing a sealing ring or gasket 38 for cooperation with the flat annular bottom surface of the head H. Cooling liquid supplied to the nozzle N through inlet I, circulates through the nozzle and is discharged into tube 14. The cooling liquid then passes upwardly through the annular space between flexible tube 14 and a nipple 17, to which the combustible mixture tube 10 is connected; through the annular passage between the tubes 10 and 14; through passages 18 in head H; and then through the space between an inner gas pipe 19 and a jacket 20. The water inlet I is placed at the bottom of the head since this location insures against air pockets in the water cooling system.

As illustrated in Fig. 3, to adjust the nozzle N to a different angular position, the union 15 is disconnected and the flexible tube 14 is longitudinally compressed, as by hand, so that inner union 11 is accessible. Any cooling liquid within the flexible tube 14 will flow out, so that the inner union 11 may be loosened and the nozzle N turned to any desired position about the axis of the joint, after which the union 11 may be tightened without, of course, any cooling liquid flowing into the gas passage, or any gas flowing into the cooling liquid passage since the latter is open to the atmosphere. A snap ring 35 fits an annular groove 36 in the member 10 to prevent the inner union or nut 11 from slipping down on the tube 10 out of reach of the fingers. After inner union 11 is tightened to seal the gas passage and hold the nozzle N in its new position, the flexible tube 14 is released and the outer union 15 is tightened. Thus, the nozzle N is angularly adjusted in a relatively easy and simple manner without any of the disadvantages of prior types of dual or multiple connections.

From the foregoing it will be apparent that this invention provides a multiple connection which is readily adjustable, and in which the tendency for one fluid to flow into the passage for another fluid, when an adjustment is made, is minimized to a high degree. Although only one embodiment of this invention has been described and illustrated, it will be understood that various changes may be made without departing from the spirit and scope of the invention as defined in the appended claims. For example, as shown, the water first enters the head, circulates through the head and then upward through the connection to the blowpipe itself. It may be quite as satisfactory under certain operating conditions to reverse the flow of water, in which case the inlet connection on the head becomes the outlet of the system. Furthermore, a portion or all of this discharge water could be used for quenching purposes under the progressive method of flame hardening.

What is claimed is:

1. A connection for use between first and second members, wherein a plurality of fluids are conveyed between said members, comprising inner conduit means connecting a fluid passage in said first member with a corresponding fluid passage in said second member; relatively flexible conduit means surrounding said inner conduit means and connecting another fluid passage in said first member with a corresponding fluid passage in said second member; an adjustable joint including a union in said inner conduit means; and an adjustable and separable joint in said relatively flexible conduit means, whereby said relatively flexible conduit means may be separated at said joint and then flexed to afford access to said union in said inner conduit means.

2. A connection for use between a blowpipe head and nozzle, wherein at least a combustible mixture of gases and a cooling liquid are conveyed between said head and said nozzle, said connection comprising inner conduit means connecting a combustible gas passage in said head with a corresponding passage in said nozzle; relatively flexible conduit means surrounding said inner conduit means and connecting a cooling liquid passage in said nozzle with a corresponding passage in said head; an adjustable joint including a union in said inner conduit means; and an adjustable and separable joint in said relatively flexible conduit means, whereby said relatively flexible conduit means may be separated at said joint and compressed to afford access to said union in said inner conduit means.

3. In flame heating apparatus wherein a blowpipe is provided with a nozzle having a plurality of combustible mixture outlets in a side thereof and said nozzle is to be rotated to different positions for heating different types of articles, and also wherein a combustible gas is supplied from said blowpipe to said nozzle and a cooling liquid is circulated through said nozzle and then through the remainder of said blowpipe, a connection for use between said nozzle and the head of said blowpipe, comprising a rigid supporting tube connecting a combustible gas passage in said head with a corresponding passage in said nozzle; a relatively flexible conduit surrounding said tube and connecting the outlet of the cooling liquid passages in said nozzle with a cooling liquid passage in said head; an adjustable joint including a union in said tube; and an adjustable and separable joint in said conduit, whereby said conduit may be separated at said joint and flexed to afford access to said union of the joint in said tube.

4. In flame heating apparatus wherein a blowpipe is provided with a nozzle having at least one outlet in a side thereof and said nozzle is to be rotated to different positions for heating different types of articles, a connection for use between said nozzle and the head of said blowpipe, comprising a rigid supporting tube connecting a passage in said head with a corresponding passage in said nozzle; a relatively flexible conduit surrounding said tube; an adjustable joint including a union in said tube; and an adjustable and separable joint in said conduit, whereby said conduit may be separated at said joint and flexed to afford access to said union of the joint in said tube.

5. The combination with a blowpipe head and nozzle, of a rigid inner member, a longitudinally compressible outer member surrounding said inner member in spaced relation, a releasable inner joint including a union for changing the position of said nozzle with respect to said head about the longitudinal axis of said inner member when the union of said inner joint is partially released, and a releasable outer joint for exposing said union of the inner joint when said outer joint is released and said outer member is longitudinally compressed.

6. The combination with a blowpipe head and and nozzle, of a rigid inner member for conducting combustible gas from said head to said nozzle, a longitudinally compressible outer member surrounding said inner member in spaced relation for conducting cooling liquid from said nozzle to said head, a releasable normally gas-tight inner joint including a union for changing the angular position of said nozzle with respect to said head about the longitudinal axis of said inner member when said inner joint is partially released, and a releasable normally liquid-tight outer joint for exposing said union of the inner joint when said outer joint is released and said outer member is longitudinally compressed.

7. A connection for use between first and second members, wherein a plurality of fluids are conveyed between said members, comprising inner conduit means connecting a fluid passage in said first member with a corresponding fluid passage in said second member; outer conduit means surrounding said inner conduit means and connecting another fluid passage in said first member with a corresponding fluid passage in said second member; an adjustable joint including a union in said inner conduit means; and an adjustable and separable joint in said outer conduit means, at least one of said conduit means being relatively flexible, whereby said outer conduit means may be separated at the joint and the flexible conduit means then flexed to afford access to said union in said inner conduit means.

ARTHUR K. SEEMANN.